US009313093B2

(12) United States Patent
Jadav et al.

(10) Patent No.: US 9,313,093 B2
(45) Date of Patent: Apr. 12, 2016

(54) ETHERNET FAULT MANAGEMENT SYSTEMS AND METHODS

(71) Applicant: CIENA CORPORATION, Hanover, MD (US)

(72) Inventors: Asheesh Jadav, Milpitas, CA (US); Cory D. Gordon, Colbert, WA (US); Madhavi R. Joshi, San Jose, CA (US); Venkata Satya Mahesh Jetti, Sunnyvale, CA (US); Sri Siri Vineela Kukkadapu, San Jose, CA (US); Kelly D. Fromm, Newman Lake, WA (US)

(73) Assignee: Ciena Corporation, Hanover, MD (US)

( * ) Notice: Subject to any disclaimer, the term of this patent is extended or adjusted under 35 U.S.C. 154(b) by 564 days.

(21) Appl. No.: 13/676,429

(22) Filed: Nov. 14, 2012

(65) Prior Publication Data

US 2014/0133289 A1  May 15, 2014

(51) Int. Cl.
*H04L 12/24* (2006.01)

(52) U.S. Cl.
CPC ......... *H04L 41/0672* (2013.01); *H04L 41/0681* (2013.01)

(58) Field of Classification Search
CPC . H04L 41/06; H04L 41/0654; H04L 41/0672; H04L 41/0681
USPC ............... 370/241.1, 245, 255, 216, 241, 389
See application file for complete search history.

(56) References Cited

U.S. PATENT DOCUMENTS

| 7,768,928 | B2 * | 8/2010 | Harel et al. ............... 370/241.1 |
| 7,860,116 | B2 | 12/2010 | Tadimeti et al. |
| 7,924,730 | B1 | 4/2011 | McAllister et al. |
| 7,948,874 | B2 | 5/2011 | Tadimeti et al. |
| 7,996,559 | B2 | 8/2011 | Mohan et al. |
| 2008/0101241 | A1 | 5/2008 | Mohan et al. |
| 2009/0003313 | A1 | 1/2009 | Busch et al. |
| 2009/0154364 | A1 * | 6/2009 | Felkar et al. ............... 370/245 |
| 2009/0161562 | A1 | 6/2009 | Shah et al. |
| 2009/0279542 | A1 * | 11/2009 | Wong .................. H04L 43/0823 370/389 |
| 2010/0188983 | A1 * | 7/2010 | Washam et al. ............... 370/245 |

(Continued)

OTHER PUBLICATIONS

IEEE Computer Society—Sponsored by the LAN/MAN Standards Committee; "IEEE Standard for Local and metropolitan area networks—Virtual Bridged Local Area Networks—Amendment 5: Connectivity Fault Management"; IEEE Std 802.1ag TM-2007—IEEE—3 Park Avenue New York, NY—Dec. 17, 2007.

(Continued)

*Primary Examiner* — Kwang B Yao
*Assistant Examiner* — Syed M Bokhari
(74) *Attorney, Agent, or Firm* — Clements Bernard PLLC; Christopher L. Bernard; Lawrence A. Baratta, Jr.

(57) ABSTRACT

Ethernet fault management systems and methods using programmable Type-Length-Value (TLV) offsets combine software-based Operations, Administration, and Maintenance (OAM) protocol support with hardware-based fault management support to delegate generation and processing of OAM protocol messages to hardware devices with the software-based protocol support used to program hardware based on fixed offsets in the OAM protocol messages. The hardware can be designed to be flexible since the hardware can be agnostic to the logic within the OAM protocol which would reside in the software. The Ethernet fault management systems and methods combine the flexibility of software-based approaches with the speed and efficiency of hardware-based approaches.

20 Claims, 7 Drawing Sheets

(56) References Cited

U.S. PATENT DOCUMENTS

| | | |
|---|---|---|
| 2011/0085545 A1 | 4/2011 | Tadimeti et al. |
| 2011/0128861 A1* | 6/2011 | Ding et al. ............... 370/241.1 |
| 2011/0255417 A1 | 10/2011 | Mohan et al. |
| 2013/0077529 A1* | 3/2013 | Lueckenhoff et al. ........ 370/255 |
| 2014/0078884 A1* | 3/2014 | Shukla et al. ................ 370/216 |

OTHER PUBLICATIONS

Yaakov (Jonathan) Stein, Chief Scientist—RAD Data Communications; "White Paper—Ethernet OAM"—RAD data communications Ltd.—Innovative Access Solutions—(c) 2006 RAD Data Communications. Catalog No. 802354 Version Mar. 2006.

* cited by examiner

ETHERNET FAULT MANAGEMENT SYSTEMS AND METHODS

FIELD OF THE INVENTION

Generally, the field of art of the present disclosure pertains to networking Operations, Administration, and Maintenance (OAM) systems and methods, and more particularly, to Ethernet fault management systems and methods using programmable Type-Length-Value (TLV) offsets.

BACKGROUND OF THE INVENTION

Carrier Ethernet is evolving to support the needs of the carrier network environment. Carrier Ethernet requires scalable, reliable, and dynamic mechanisms to support operations, administration, and management (OAM) and traffic engineering (TE). Standards have been developed in the Metro Ethernet Forum (MEF), International Telecommunication Union (ITU), Institute of Electrical and Electronics Engineers (IEEE), and the like providing many of these required extensions. Specifically, Connectivity Fault Management (CFM) is an Ethernet standard to provide many common OAM functions associated with underlying network transport for services. For example, CFM is defined in IEEE 802.1ag-2007 IEEE Standard for Local and Metropolitan Area Networks Virtual Bridged Local Area Networks Amendment 5: Connectivity Fault Management, the contents of which are herein incorporated by reference. Also, OAM functions are also defined in ITU-T G.8013/Y.1731 (07/2011) "OAM functions and mechanisms for Ethernet based networks," the contents of which are herein incorporated by reference. Further, the MEF also defines Ethernet OAM in various technical specifications, such as MEF 17 (04/2007) "Service OAM Requirements & Framework," the contents of which are herein incorporated by reference. Of course, other standards, specifications, and recommendations exist, are continually being added and updated, and are contemplated herein.

From an implementation perspective, Ethernet switches, nodes, devices, etc. require support for the various OAM protocols, and, conventionally, such support is a software-based feature. Software-based features and support have advantages of flexibility, i.e. protocol support can be easily updated, changed, added, etc., but disadvantages of processing efficiency and speed. As such, development has proceeded with hardware-based fault management support to delegate generation and processing of OAM protocol messages to hardware devices such as, without limitation, Field Programmable Gate Arrays (FPGAs), Application Specific Integrated Circuits (ASICs), Network Processors (NPs), and the like. Speed and efficiency are critical for carrier-grade environments. Hardware-based designs provide processing efficiency and speed but at the expense of flexibility. Specifically, a challenge in hardware-based fault management is that deep packet inspection for handling variable packet formats and TLV objects is expensive and difficult to implement.

Additionally, another challenge associated with hardware-based fault management includes handling fault detection on Link Aggregation Group (LAG) ports spread across multiple devices. LAG generally refers to systems and methods for combining, i.e. aggregating, multiple network connections in parallel to increase throughput beyond that of a single connection. Conventional systems and methods handle LAG ports via an OAM protocol manager in software. Disadvantageously, this approach is inefficient when a receive port of the LAG changes, the OAM protocol manager may generate false Loss of Continuity (LOC) alarms and disrupt the service. Problematically, OAM cannot be configured in hardware-based designs on LAG ports spread across multiple devices since each device is monitoring Continuity Check Messages (CCMs) separately.

BRIEF SUMMARY OF THE INVENTION

In various exemplary embodiments, an Ethernet fault management method includes receiving a first control packet from a remote Maintenance End Point (MEP); analyzing the first control packet in software to determine objects present therein and associated offsets; programming a hardware device based on the determined objects present and the associated offsets; and receiving subsequent control packets from the remote MEP and processing the subsequent control packets in the hardware device based on the programming. The Ethernet fault management method can further include detecting a mismatch by the hardware device; and raising an interrupt or sending a control packet associated with the mismatch to the software for processing. The hardware device can include one of a Field Programmable Gate Array, an Application Specific Integrated Circuit, and a Network Processor. The objects comprise Type-Length-Value (TLV) objects. The Ethernet fault management method can further include updating the software to support extensibility of the TLV objects. The control packets can include Protocol Data Units in accordance with Connectivity Fault Management. The control packets can include Continuity Check Messages (CCMs). The TLV objects can include at least one Organization-Specific TLV. The TLV objects can include an Interface Status TLV and a Port Status TLV. The Ethernet fault management method can further include determining a Link Aggregation Group (LAG) includes ports spread across different hardware devices; programming a software shim layer on each of the different hardware devices responsive to the determining; processing faults at the software shim layer on each of the different hardware devices; and generating a Loss of Continuity (LOC) for the LAG if LOC is present on each of the ports spread across the different hardware devices. The Ethernet fault management method can further include removing the LOC for the LAG if any one of the ports spread across the different hardware devices has the LOC cleared.

An Ethernet node includes a port communicatively coupled to a remote device; a hardware device associated with the port; and a processor executing software; wherein the port, the hardware device, and the processor are cooperatively configured to: receive a first control packet from the remote device; analyze the first control packet with the software to determine objects present therein and associated offsets; program the hardware device based on the determined objects present and the associated offsets; and receive subsequent control packets from the remote device and process the subsequent control packets in the hardware device based on the programming. The port, the hardware device, and the processor can be further cooperatively configured to: detect a mismatch by the hardware device; and raise an interrupt or send a control packet associated with the mismatch to the software for processing. The hardware device can include one of a Field Programmable Gate Array, an Application Specific Integrated Circuit, and a Network Processor. The objects can include Type-Length-Value (TLV) objects. The port, the hardware device, and the processor can be further cooperatively configured to update the software to support extensibility of the TLV objects. The control packets can include Protocol Data Units in accordance with Connectivity Fault Management. The TLV objects can include at least one Organization-Specific TLV, an Interface Status TLV, and a Port Status TLV. The port, the hardware device, and the processor can be further cooperatively configured to: determine a Link Aggregation Group (LAG) in which the port participates in comprises ports spread across different hardware devices; program a software shim layer responsive to the determining; process faults at the software shim layer; generate a Loss of Continuity (LOC) for the LAG if LOC is present on each of the software shim layers spread across the different hardware devices; and remove the LOC for the LAG if any one of the ports spread across the different hardware devices has the LOC cleared.

In yet another exemplary embodiment, a network includes a plurality of interconnected nodes each supporting Connectivity Fault Management Ethernet therebetween; wherein each of the plurality of interconnected nodes includes: a port communicatively coupled to another node of the plurality of interconnected nodes; a hardware device associated with the port; and a processor executing software; wherein the port, the hardware device, and the processor are cooperatively configured to: receive a first control packet from the another node; analyze the first control packet with the software to determine Type-Length-Value (TLV) objects present therein and associated offsets; program the hardware device based on the determined TLV objects present and the associated offsets; and receive subsequent control packets from the remote device and process the subsequent control packets in the hardware device based on the programming.

BRIEF DESCRIPTION OF THE DRAWING(S)

Exemplary and non-limiting embodiments of the present disclosure are illustrated and described herein with reference to various drawings, in which like reference numbers denote like method steps and/or system components, respectively, and in which.

DETAILED DESCRIPTION OF THE INVENTION

In various exemplary embodiments, Ethernet fault management systems and methods using programmable TLV offsets combine software-based OAM protocol support with hardware-based fault management support to delegate generation and processing of OAM protocol messages to hardware devices with the software-based protocol support used to program hardware based on fixed offsets in the OAM protocol messages. The hardware can be designed to be flexible since the hardware can be agnostic to the logic within the OAM protocol which would reside in the software. The Ethernet fault management systems and methods combine the flexibility of software-based approaches with the speed and efficiency of hardware-based approaches. Also, the systems and methods provide a mechanism to handle extensibility of the OAM protocols, thus future proofing the hardware. Similarly, the systems and methods can speed up support for new TLV objects as required in the hardware.

Specifically, the systems and methods utilize hardware to process OAM messages and TLV objects with software providing assistance. When a control protocol frame is first received which has a TLV object in it, instead of building the intelligence in the hardware to parse the TLV, a copy of the packet is passed on to the software. The software then parses the TLV object and based on the offset in the control protocol frame where this TLV occurs, the software then programs the hardware to look for specific contents in the control protocol at the fixed offset. Subsequently, the hardware can then act upon any change in contents at the specified location (i.e., the fixed offset) in the packet without having to know the meaning of those contents. Thus, the hardware can process and generate data for the TLV object based on being programmed to do so by the software based on the first received control protocol frame. Note, while TLV objects are described herein for illustration purposes, the systems and methods contemplate other objects in control packets such as, without limitation, remote MEP CCM defects (CCM timeout), Error CCM defects, and cross-connect defects are determined by examining fields in the fixed portion of the message (MEP ID, MAID, CCM-INTERCAL), etc.

Figure 1:
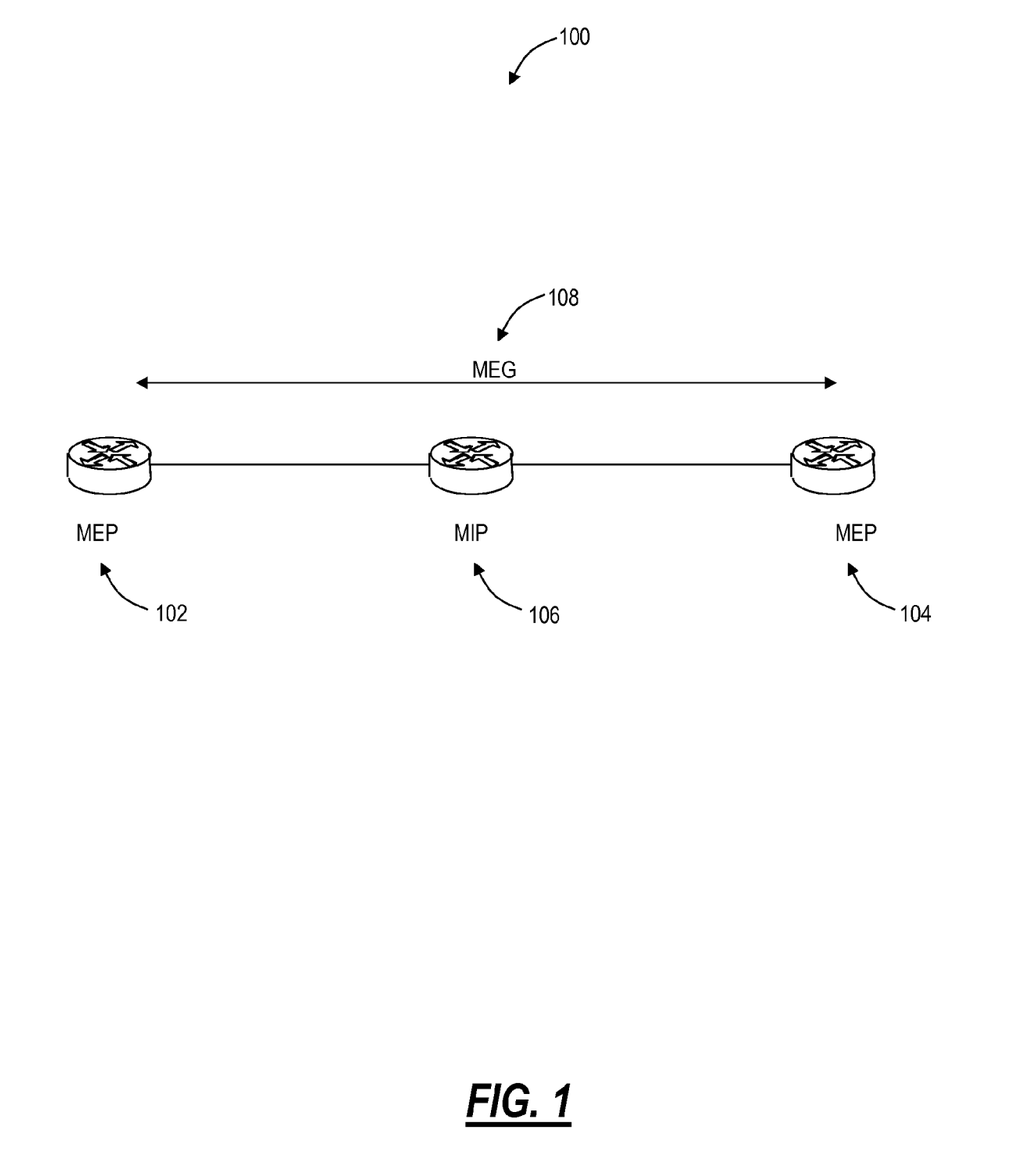
FIG. 1 is a network diagram of an Ethernet network configured with Ethernet OAM mechanisms.

Referring to FIG. 1, in an exemplary embodiment, a network diagram illustrates an Ethernet network 100 configured with Ethernet OAM mechanisms. For illustration purposes, the Ethernet network 100 includes three interconnected network elements 102, 104, 106. The IEEE 802.1ag Connectivity Fault Management (CFM) standard provides many of the common OAM functions associated with the underlying network transport for services. Fundamental to CFM is the concept of a Maintenance Entity Group (MEG) or a Maintenance Association (MA), which is the identified network transport construct spanning the various network nodes underlying a given service or set of services. CFM relies on well defined messages exchanged between the network elements, specifically and in particular each End Point (MEP) that provides origination and termination of the service transport path(s) for a MEG. The network elements 102, 104 are defined as a MEG End Point (MEP). In CFM, a MEP is configured to source and sink CFM frames, i.e. source and sink within a single configured MD (Maintenance Domain), pass-thru if MD Level is higher than the configured level for the MEP, and discard if MD Level is lower. In a point-to-point network, there are two MEP nodes at the endpoints, and in other configurations, there may be multiple MEP nodes. Also, a CFM domain having one or more Maintenance Intermediate Point (MIP) nodes that may be bounded by a plurality of MEP nodes. In order that CFM frame flows are appropriately filtered so that they are processed only by the intended domain's nodes, the MEP/MIP population of an Ethernet CFM network is configured appropriately.

The network element 106 is defined as a MIP which resides between MEPs, i.e. the MIP 106 is communicatively coupled between the MEPs 102, 104. A MIP is configured to process and forward CFM frames, but does not initiate CFM frames. Although a MIP does not initiate protocol transactions, it does transmit Loopback Reply (LBR) and Linktrace Reply (LTR) messages in response to received Loopback Message (LBM) and Linktrace Message (LTM) messages respectively. As described herein, MEP and MIP terminology is used for nodes present at endpoints and intermediate points, respectively, in the Ethernet network 100. Also, Ethernet Path terminology is used to denote a point-to-point Ethernet connection between two nodes, e.g. the connection being built using Virtual Local Area Network (VLAN) cross connection or unicast Ethernet Media Access Control (MAC) plus VLAN connection. Additionally, other types of Ethernet paths, such as, for example, Provider Backbone Bridging-Traffic Engineering (PBB-TE), MPLS-TP, and the like are also contemplated by the Carrier Ethernet systems and methods described herein.

The Carrier Ethernet systems and methods contemplate implementation and operation on Carrier Ethernet networks such as those compliant to IEEE 802.1ag-2007, G.8013/Y.1731, and/or MEF. Of note, IEEE 802.1ag-2007 and G.8013/Y.1731 both relate to and define CFM for Ethernet OAM. Various terminology utilized herein, such as MEP, MIP, CCM, PDU, etc. is common to each of IEEE 802.1ag-2007, G.8013/Y.1731, MEF, etc. IEEE 802.1ag-2007 utilizes the term Maintenance Association (MA) whereas G.8013/Y.1731 utilizes Maintenance Entity Group (MEG) for the same construct. Those of ordinary skill in the art will recognize while described herein as the MEG 108, the MEG 108 could also be referred to as the MA 108. Generally, the MEG 108 and MA relate to an administrative grouping relative to the MEPs 102, 104. Additionally, IEEE 802.1ag-2007 defines a MEP as a Maintenance association End Point whereas G.8013/Y.1731 and MEF define a MEP as a Maintenance Entity Group End Point. In the following description, MEP may be generally referred to as a Maintenance End Point covering both the constructs of IEEE 802.1ag-2007, G.8013/Y.1731, MEF, etc.

The network elements 102, 104, 106 are configured in a MEG 108 which enable a grouping of nodes in a maintenance group for OAM to be grouped on different spans. The MEG 108 (or an MA 108) is a set of MEPs, each configured with a same unique MEG ID code (UMC) and MEG Level or Maintenance Association Identifier (MAID) and Maintenance Domain (MD) level. The MEG 108 may be thought of as a full mesh a Maintenance Entities (MEs), the MEs including MEPs, MIPs, etc., with a set of MEPs configured therebetween. The UMC is a unique identifier for the MEG 108 domain. Additionally, the MEG 108 allows for nesting of various groups. The MEG Level and the MD is a management space on a network, typically owned and operated by a single entity. MEG Levels and MDs may be configured with names and levels, where the eight levels range from 0 to 7. A hierarchal relationship exists between domains based on levels. The larger the domain, the higher the level value. In case MEGs are nested, the OAM flow of each MEG has to be clearly identifiable and separable from the OAM flows of the other MEGs. In cases the OAM flows are not distinguishable by the ETH layer encapsulation itself, the MEG Level in the OAM frame distinguishes between the OAM flows of nested MEGs. Eight MEG Levels are available to accommodate different network deployment scenarios.

In an exemplary embodiment, the network 100 may utilize Continuity Check Messages (CCMs) which are "heart beat" messages for CFM. Specifically, the CCMs provide a means to detect connectivity failures in the MEG 108. CCMs are multicast messages which are confined to a domain (MD). CCMs are unidirectional and do not solicit a response. Each MEP 102, 104 sends a CCM frame periodically to its peer MEP 102, 104. All MEPs 102, 104 are configured with a periodic interval, and this is also signaled in the CCM frame for verification. Each MEP 102, 104 expects to receive a CCM frame by the end of that periodic interval. Non-receipt of certain number of consecutive frames results in a fault. This fault is indicated in Remote Defect Indication (RDI) bit of a CCM frame sent to a peer. This is useful for one-way fault conditions. The MEP 102, 104 exits a fault state only after receiving a certain number of consecutive CCM frames, each at the specified interval. Additionally, the CCM can detect misconnections by comparing MA and MEP identifiers (ID) from the frame with configured values. CCMs may be used per VLAN per MEG/MA level. Each CCM is sent at the highest priority and is ineligible for discard. For scaling purposes of CCM processing, some level of hardware support is typically utilized. Note, MIPs 106 conventionally do not terminate CCM frames, but rather simply forward them along based on frame forwarding criteria in the path (i.e., VLAN swap for VLAN cross-connects, destination MAC plus VLAN based forwarding for bridge path, etc.).

Figure 2:
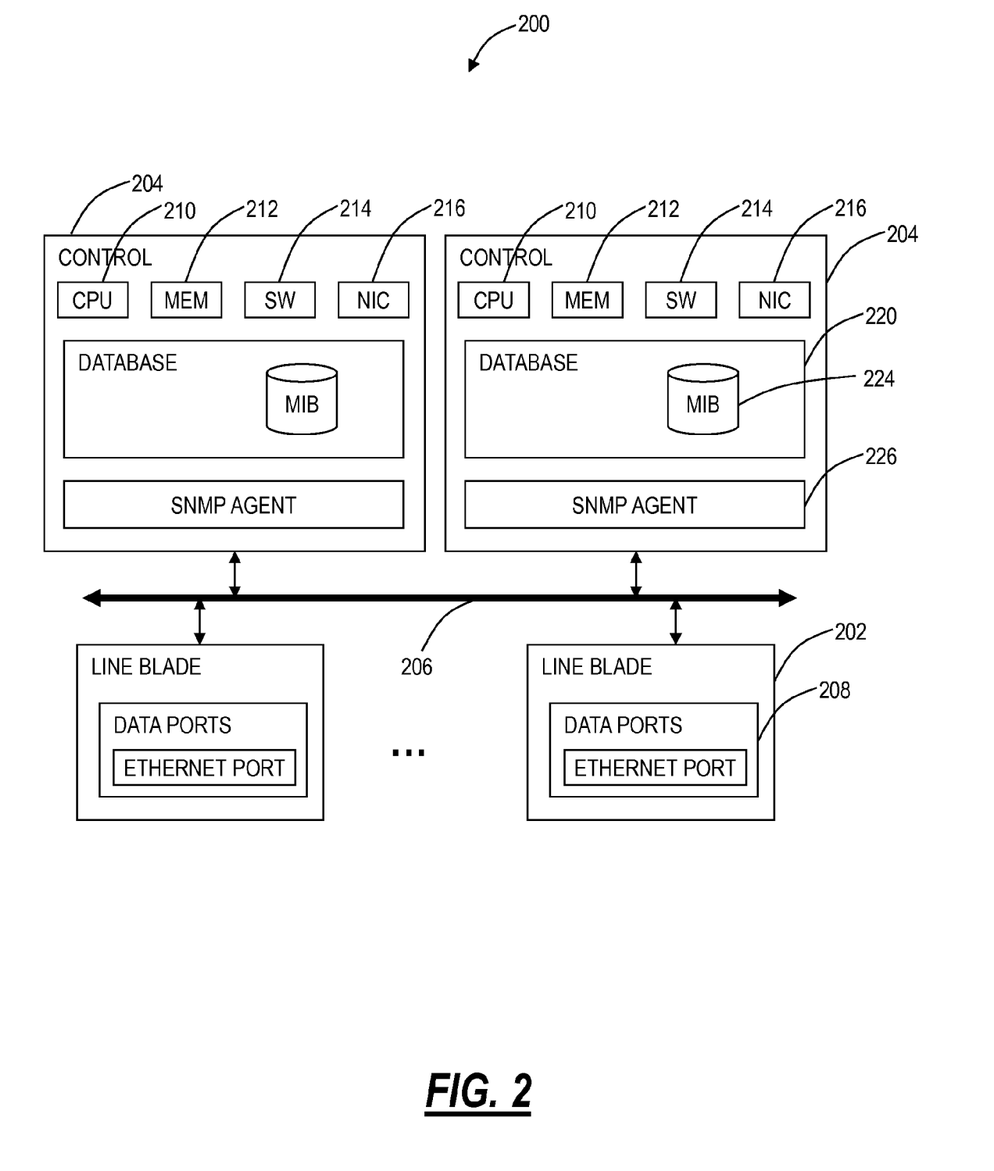
FIG. 2 is a block diagram of an exemplary implementation of a network element such as for the MEP and/or the MIP in the network of FIG. 1.

Referring to FIG. 2, in an exemplary embodiment, a block diagram illustrates an exemplary implementation of a network element 200 such as for the MEP 102, 104 and/or the MIP 106 in the network 100. In this exemplary embodiment, the network element 200 is an Ethernet network switch for illustration purposes, but those of ordinary skill in the art will recognize the Carrier Ethernet systems and methods described herein contemplate other types of network elements and other implementations providing Ethernet OAM. In this exemplary embodiment, the network element 200 includes a plurality of blades 202, 204 interconnected via an interface 206. The blades 202, 204 are also known as line cards, line modules, circuit packs, pluggable modules, etc. and refer generally to components mounted within a chassis, shelf, etc. of a data switching device, i.e. the network element 200. Each of the blades 202, 204 may include numerous electronic devices and/or optical devices mounted on a circuit board along with various interconnects including interfaces to the chassis, shelf, etc. Two exemplary blades are illustrated with line blades 202 and control blades 204. The line blades 202 generally include data ports 208 such as a plurality of Ethernet ports. For example, the line blade 202 may include a plurality of physical ports disposed on an exterior of the blade 202 for receiving ingress/egress connections. Exemplary port types may include, without limitation, gigabit Ethernet (GbE), 10 GbE, 40 GbE, 100 GbE, Ethernet over SONET/SDH, Ethernet over Optical Transport, and the like. Additionally, the line blades 202 may include switching components to form a switching fabric via the interface 206 between all of the data ports 208 allowing data traffic to be switched between the data ports 208 on the various line blades 202. The switching fabric is a combination of hardware, software, firmware, etc. that moves data coming into the network element 200 out by the correct port 208 to the next network element. In general, the switching fabric may include switching units, or individual boxes, in a node; integrated circuits contained in the switching units; and programming that allows switching paths to be controlled.

The control blades 204 include a microprocessor 210, memory 212, software 214, and a network interface 216. Specifically, the microprocessor 210, the memory 212, and the software 214 may collectively control, configure, provision, monitor, etc. the network element 200. The network interface 216 may be utilized to communicate with a management system such as a Network Management System (NMS), Element Management System (EMS), and the like. Additionally, the control blades 204 may include a database 220 that tracks and maintains provisioning, configuration, operational data and the like. The database 220 may include a management information base (MIB) 222 which may include CFM objects. Of note, the Carrier Ethernet systems and methods described herein relate in exemplary embodiments to modification of the CFM objects. Further, the control blades 204 may include a Simple Network Management Protocol (SNMP) Agent 224 configured to operate SNMPv2, SNMPv3, etc. or some other network management communication protocol. In this exemplary embodiment, the network element 200 includes two control blades 204 which may operate in a redundant or protected configuration such as 1:1, 1+1, etc. In general, the control blades 204 maintain dynamic system information including Layer two forwarding databases, protocol state machines, and the operational status of the ports 208 within the network element 200. Additionally, the control blades 204 may be configured to provide CFM and the Ethernet systems and methods for dynamic configuration thereof.

Figure 3A:
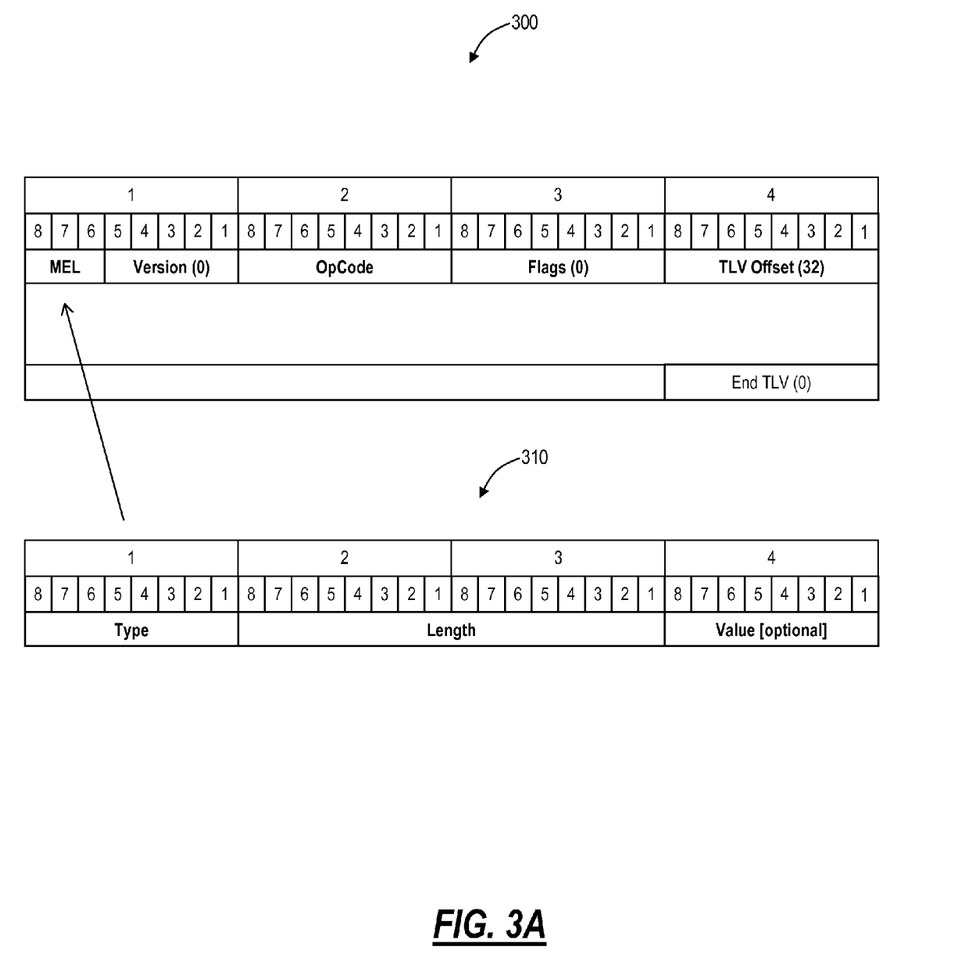
FIGS. 3A-3B are block diagrams of various Ethernet OAM protocol data units (PDUs) including a general PDU (FIG. 3A) and a CCM (FIG. 3B)
Figure 3B:
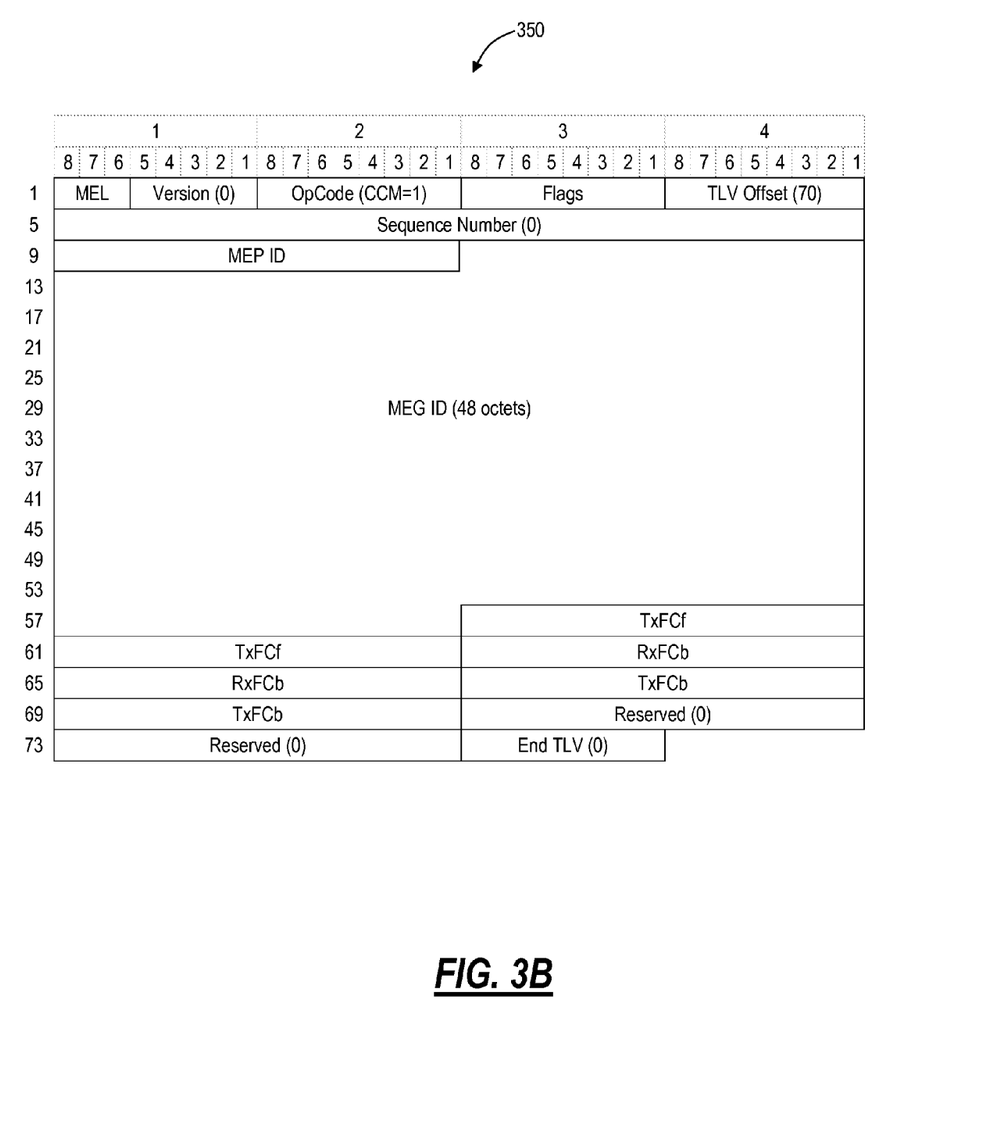

Referring to FIGS. 3A-3B, in an exemplary embodiment, block diagrams illustrate various Ethernet OAM protocol data units (PDUs) 300, 350 including a general PDU (FIG. 3A) and a CCM (FIG. 3B). The Ethernet OAM PDUs 300, 350 can be generally referred to as control frames for OAM and are based on the various standards, specifications, and/or recommendations described herein. The PDU 300 includes a MEG Level (MEL) which is an integer value that identifies MEG level of OAM PDU with value ranges from 0 to 7, a version field that contains an integer value that identifies the OAM protocol version, an OpCode identifying an OAM PDU type, a flag field that is used based on the OAM PDU type, and a TLV offset containing the offset to the first TLV in the PDU 300 relative to the TLV Offset field. The OpCode is used to identify the remaining content of the OAM PDU 300. For example, the PDU 300 can be a CCM (OpCode 1), a Loopback Message (LBM, OpCode 3), a Loopback Reply (OpCode 2), a Link Trace Message (LTM, OpCode 5), a Link Trace Reply (LTR, OpCode 4), an Alarm Indication Signal (AIS, OpCode 33), Locked (LCK, OpCode 35), a Test (TST, OpCode 37), a Maintenance Communication Channel (MCC, OpCode 41), LMM (OpCode 43), LMR (OpCode 42), a One-way Delay Measurement (1DM, OpCode 45), DMM (OpCode 47), DMR (OpCode 46), Experimental OAM Message (EXM, OpCode 49), Experimental OAM Reply (EXR, OpCode 48), Vendor-Specific OAM Message (VSM, OpCode 51), Vendor-Specific OAM Reply (VSR, OpCode 50), Client Signal Fail (CSF, OpCode 52), Synthetic Loss Message (SLM, OpCode 55), and Synthetic Loss Reply (SLR, OpCode 54). The PDU 300 can include Type-Length-Value (TLV) 310 fields between the TLV Offset and the end TLV.

The TLV 310 fields are used to encode information inside the PDU 300. The type field of the TLV 310 is a binary code which indicates the kind of field that this part of the message represents. The length field of the TLV 310 is the size of the value field, and the value field of the TLV 310 contains the data for this part of the message. Finally, End TLV is an all-zeros octet value at the end of the PDU 300. If the type field is 0, then no length or value fields follow. If the type field is not 0, at least the length field follows the type field. The 16 bits of the length field indicate the size, in octets, of the value field. The following table illustrates exemplary type field values from IEEE 802.1ag-2007:

TABLE 1

Type Field values

| TLV or organization | Type Field |
| --- | --- |
| End TLV | 0 |
| Sender ID TLV | 1 |
| Port Status TLV | 2 |

TABLE 1-continued

Type Field values

| TLV or organization | Type Field |
| --- | --- |
| Data TLV | 3 |
| Interface Status TLV | 4 |
| Reply Ingress TLV | 5 |
| Reply Egress TLV | 6 |
| LTM Egress Identifier TLV | 7 |
| LTR Egress Identifier TLV | 8 |
| Reserved for IEEE 802.1 | 9-30 |
| Organization-Specific TLV | 31 |
| Defined by ITU-T Y.1731 | 32-63 |
| Reserved for IEEE 802.1 | 64-255 |

The Organization-Specific TLV allows any organization, i.e. equipment vendor, service provider, etc., to define TLVs for use in CFM. The Organization-Specific TLV has the following format:

TABLE 2

Organization-Specific TLV

| | Octet |
| --- | --- |
| Type = 31 | 1 |
| Length | 2-3 |
| OUI (Organizationally Unique Identifier) | 4-6 |
| Sub-Type | 7 |
| Value (optional) | 8 – Length/3 |

The TLVs can be generalized as being mandated TLVs or optional TLVs. Exemplary mandated TLVs include the Port Status TLV, the Interface Status TLV, etc., i.e. the explicitly defined TLVs in the Table 1: Type Field values. The optional TLVs can include the Organization-Specific TLV. The systems and methods described herein relate to hardware and software provisioning of either type of TLVs, especially the optional TLVs which have variable formats.

FIG. 3B is a block diagram of an exemplary CCM PDU 350 for use in the network 100, with the network element 200, and the like. As described herein, the CCM PDU 350 is multicast from MEPs to all MIPs and MEPs associated with a given MA/MEG. In an exemplary embodiment, the CCM PDU 350 is a G.8013/Y.1731 Ethernet Continuity Check (ETH-CC) PDU. Generally, CCMs refer to the overall PDU whereas the ETH-CC represents the information contained therein. The ETH-CC function is used for proactive OAM such as to detect loss of continuity (LOC) between any pair of MEPs in a MEG, unintended connectivity between two MEGs (Mismerge), unintended connectivity within the MEG with an unexpected MEP (Unexpected MEP), and other defect conditions (e.g. Unexpected MEG Level, Unexpected Period, etc.). Thus, the CCM is applicable for fault management, performance monitoring, or protection switching applications. In operation, upon reception, a MEP reports a frame with unexpected ETH-CC information. When CCM transmission is enabled in a MEG/MA, all MEPs are enabled to periodically transmit frames with ETH-CC information to all other MEPs in the MEG/MA. The CCM transmission period may be the same for all MEPs in the MEG/MA. When a MEP is enabled to generate frames with ETH-CC information, it also expects to receive frames with ETH-CC information from its peer MEPs in the MEG/MA.

The CCM PDU 350 may include a MEG Level (MEL) which is a 3-bit field containing an integer value (0 to 7) that identifies the MEG Level of the CCM PDU 350. A Version field is a 5-bit field containing an integer value that identifies the OAM protocol version. An OpCode is a 1-octet field containing an OpCode that identifies an OAM PDU type, and in the case of the CCM PDU 450 is set to 1. The OpCode is used to identify the remaining content of an OAM PDU. A Flag field is an 8-bit field dependent on the OAM PDU type, and in the case of the CCM PDU 350 contains two information elements for Remote Defect Indication (RDI) and Period. A first bit of the Flag field (bit 8) is a single bit for RDI which is set to 1 to indicate a remote defect, and otherwise is set to 0. The last three bits of the Flag field (bits 3 to 1) indicate a transmission period for the CCM PDU 350.

Again, the TLV Offset is a 1-octet field containing the offset to the first TLV in the CCM 350 relative to the TLV Offset field. The value of this field is associated with an OAM PDU type, and in the case of the CCM PDU 350 is set to 70. Sequence Number is a 4-octet field that contains the transaction ID/sequence number, and in the case of the CCM PDU 450 is set to all zeros. MEP ID is a 13-bit integer value identifying the transmitting MEP within the MEG. The three most significant bits (MSBs) of the first octet are not used and set to zero. A MEG ID is a 48-octet field. The features of the MEG ID are each MEG ID must be globally unique; where it may be expected that the MEG may be required for path set-up across an inter-operator boundary, the MEG ID must be available to other network operators; the MEG ID should not change while the MEG remains in existence; and the MEG ID should be able to identify the network operator which is responsible for the MEG. TxFCf is a 4-octet field which carries the value of the counter of in-profile data frames transmitted by the MEP towards its peer MEP, at the time of CCM frame transmission. RxFCb is a 4-octet field which carries the value of the counter of in-profile data frames received by the MEP from its peer MEP, at the time of receiving the last CCM frame from that peer MEP. TxFCb is a 4-octet field which carries the value of the TxFCf field in the last CCM frame received by the MEP from its peer MEP. Finally, two reserved fields and an End TLV field are all set to all zeros in the CCM PDU 350.

Upon reception by a MEP of the CCM PDU 350, the MEP examines it to ensure that its MEG ID matches the configured MEG ID in the receiving MEP, and that the MEP ID in the CCM frame is one from the configured list of peer MEP IDs. The information in the CCM frame is catalogued and processed in the receiving MEP. The CCM PDU 350 allows detection of different defect conditions. Exemplary defect conditions may include if no CCM frames from a peer MEP are received within the interval equal to 3.5 times the receiving MEP's CCM transmission period, loss of continuity with peer MEP is detected; if a CCM frame with a MEG Level lower than the receiving MEP's MEG Level is received, Unexpected MEG Level is detected; if a CCM frame with same MEG Level but with a MEG ID different than the receiving MEP's own MEG ID is received, Mismerge is detected; if a CCM frame with the same MEG Level and a correct MEG ID but with an incorrect MEP ID, including receiving MEP's own MEP. ID, is received, Unexpected MEP is detected; if a CCM frame is received with a correct MEG Level, a correct MEG ID, a correct MEP ID, but with a period field value different than the receiving MEP's own CCM transmission period, Unexpected Period is detected. The receiving MEP may notify fault management process when it detects the above defect conditions.

Figure 4:
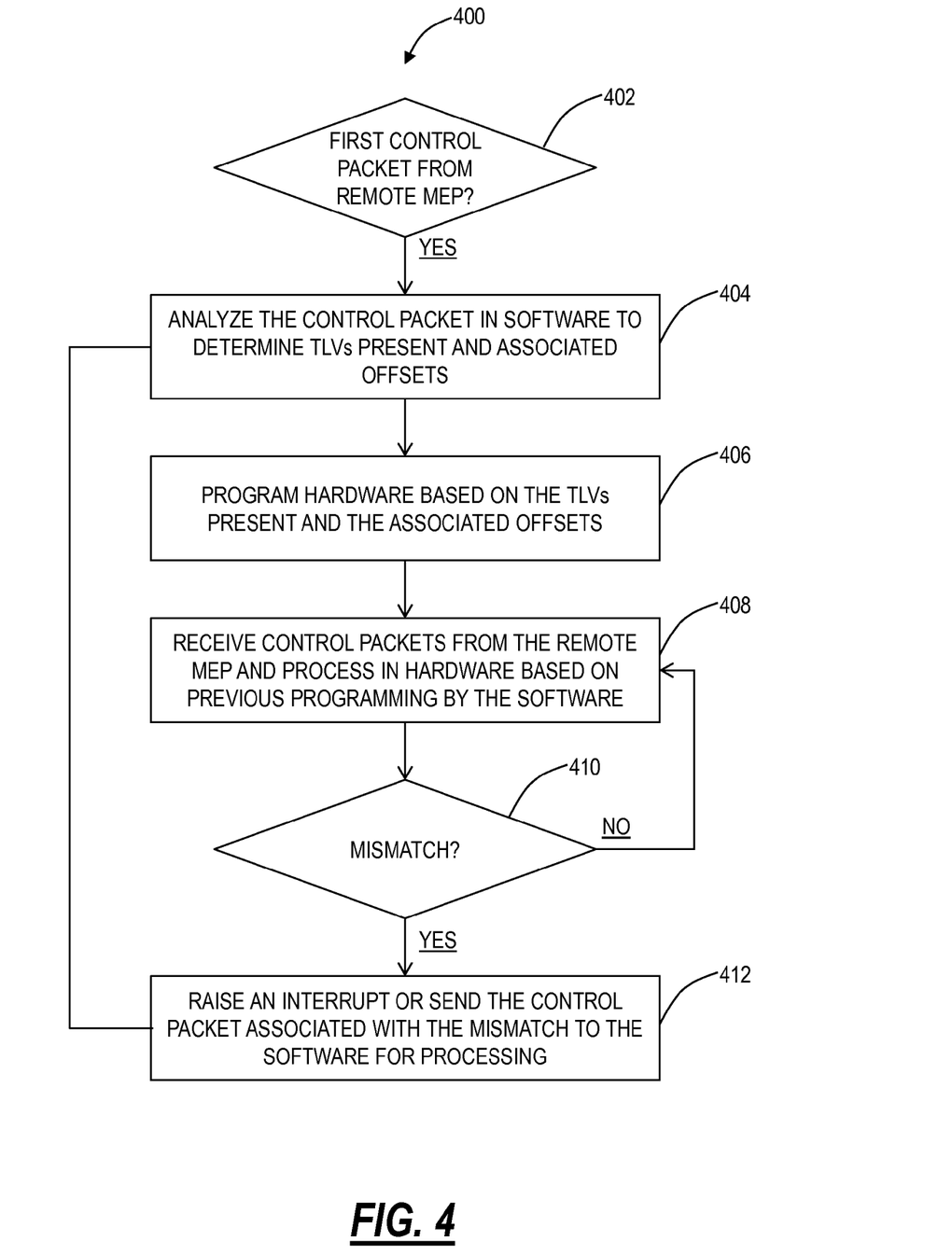
FIG. 4 is a flowchart of an Ethernet fault management method using programmable Type-Length-Value (TLV) offsets.

Referring to FIG. 4, in an exemplary embodiment, a flowchart illustrates an Ethernet fault management method 400 using programmable Type-Length-Value (TLV) offsets. The Ethernet fault management method 400 is used to process incoming control frames at an Ethernet node. For example, the Ethernet fault management method 400 can be implemented in the network 100 via the MEPs 102, 104, in the network element 200, etc. That is, functionally, the Ethernet fault management method 400 is performed at a single node, via hardware and software contained therein, upon receiving a first control packet from a remote MEP (step 402). The first control packet can be the PDU 300, the CCM PDU 350, etc., and receiving the first control packet triggers the Ethernet fault management method 400 which can be used in context of remote MEP discovery. For example, at the MEP 102, the Ethernet fault management method 400 can be initiated upon receiving the first control packet from the MEP 104.

The Ethernet fault management method 400 includes analyzing the first control packet in software to determine TLVs present and the associated offsets (step 404). Here, the software can be executed by processing elements on the line blade 202 or via the processor 210 on the control blade 204. The software is configured to perform deep packet inspection, determining each TLV object in the first control packet and the associated offsets. The software is then configured to program the hardware based on the TLV objects present and the associated offsets in the control packet (step 406). Specifically, the hardware can include FPGAs, ASICs, NPs, etc. on either the line blade 202 or the control blade 204. Subsequently received control packets from the remote MEP are received and processed by the hardware based on the previous programming by the software (step 408).

If there is a mismatch in any hardware processed TLV objects (step 410), the Ethernet fault management method 400 can raise an interrupt in hardware and/or send the control packet associated with the mismatch to the software for reprocessing (step 412), i.e. the Ethernet fault management method 400 can return to step 404 to reprogram the hardware. It is expected that after receiving the first control packet from the remote MEP, each subsequent control packet will have the same TLV objects. Thus, the software only has to be involved upon initial discovery and if there is a mismatch (e.g., if there is a change at the remote MEP, etc.). Thus, the software provides flexibility in programming the hardware in what to expect for TLV objects and offsets, and the hardware can handle the continuous processing with speed and efficiency. As described herein, the Ethernet fault management method 400 is especially useful in supporting organizationally unique TLVs.

In an exemplary embodiment, a table can be used to represent OAM received by the software for programming the hardware for specific fields in CFM related packets, e.g. CCMs. Exemplary bit fields cab relate to two exemplary TLV objects in CCM packets, namely Interface Status TLVs and Port Status TLVs. Of course, other types of TLVs are also contemplated including organizationally unique TLVs. These bit fields provide offsets for each. The Interface Status TLV Offset can be in a first bit field and can be an 8-bit value which is the byte offset used by the hardware to capture and check Interface Status TLVs in CCM frames. The Port Status TLV Offset can be in a second bit field and can be an 8-bit value which is the byte offset used by the hardware to capture and check Port Status TLVs in CCM frames. Programming each the TLV offsets can be from the start of the CCM PDU after the Etype (8902) plus 13. Setting the offset to 75+13=88 will point the hardware at the 75th byte, the one marked "End TLV(0)." This value is acted on only if the associated TLV Present bit is set.

Figure 5:
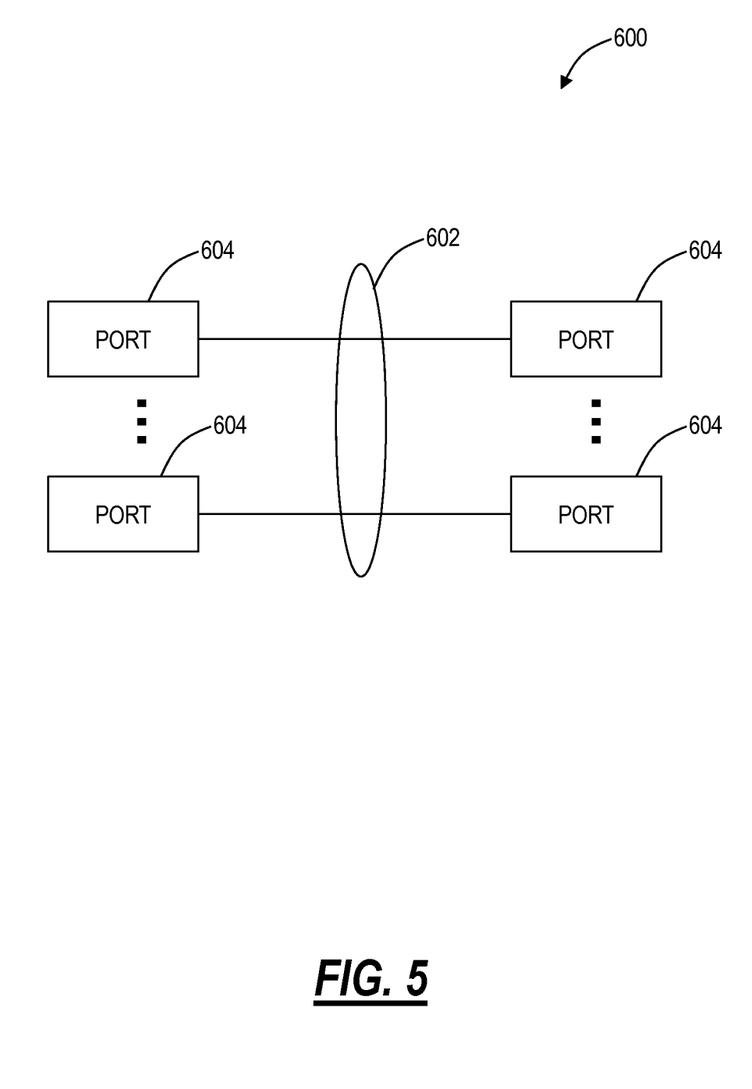
FIG. 5 is a network diagram of a network with a Link Aggregation Group (LAG)

Referring to FIG. 5, in an exemplary embodiment, a network diagram illustrates a network 600 with a Link Aggregation Group (LAG) 602. The LAG 602 is formed by multiple ports 604 which can each be said to be a member port of the LAG 602. OAM protocols like the CFM protocol defined in IEEE 802.1ag will monitor a service by sending and receiving CCMs, and CFM brings the service down when it misses three CCMs continuously and this state is known as Loss of Continuity-Check (LOC). Conventionally, for LAG ports, the OAM protocol will select one of the member ports 604 in the LAG 602 as lead port and transmit CCMs on that port 604. So, for configuring OAM in hardware on the LAG 602, CCMs must be configured to transmit on a device associated with the lead port 604 and configured to receive on a peer device that is receiving the lead port. However, this approach causes issues when the lead port of the LAG 602 changes on the peer device. Note, the ports 604 can each be on different nodes, network elements, etc. In an exemplary embodiment, the Ethernet fault management systems and methods can include a software-based solution to address fault management in the LAG 602 where the ports 604 are spread across multiple devices.

Figure 6:
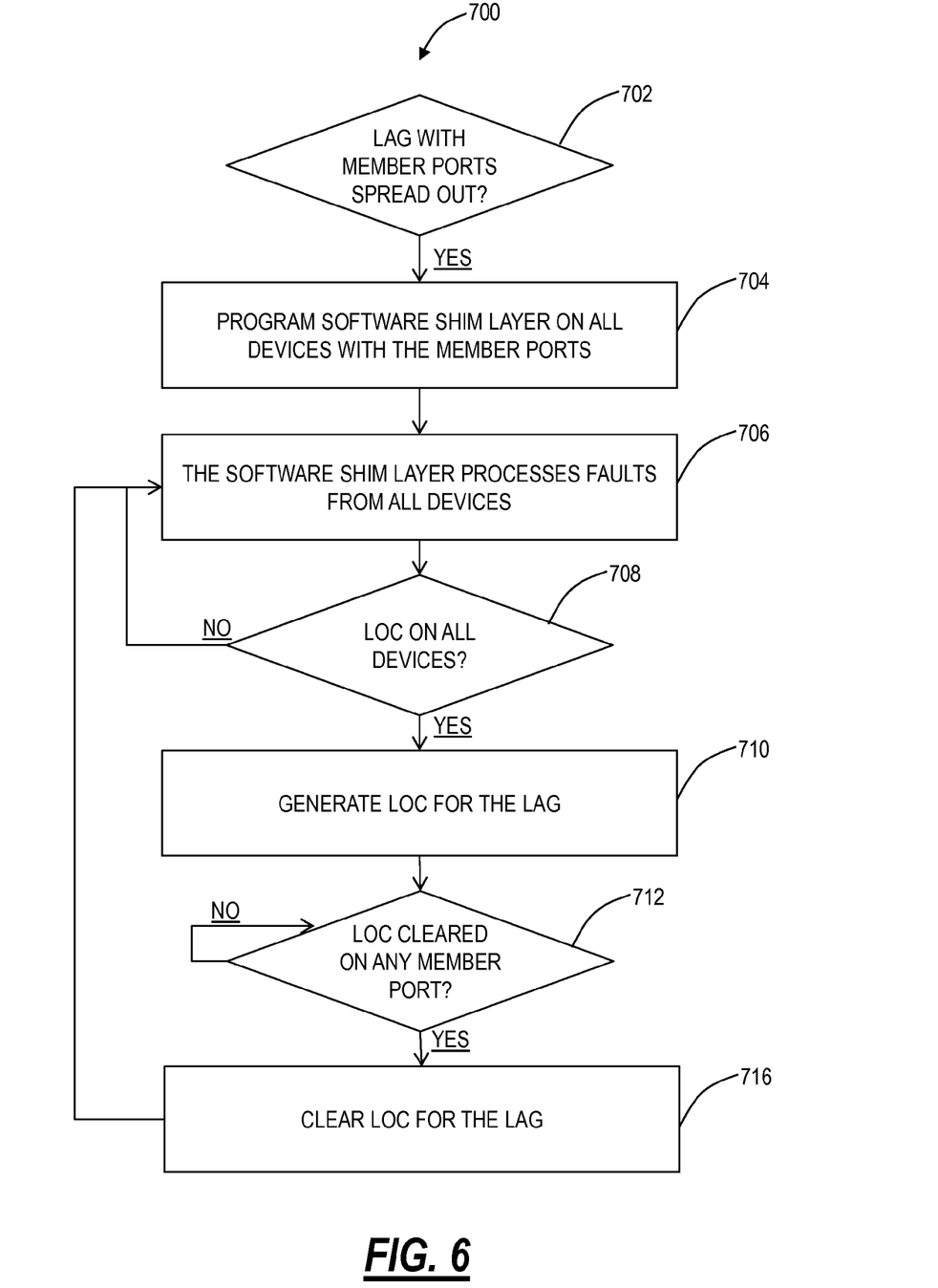
FIG. 6 is a flowchart of an Ethernet fault management method for handling fault detection on the LAG of FIG. 6 with the ports spread across different hardware devices.

Referring to FIG. 6, in an exemplary embodiment, a flowchart illustrates an Ethernet fault management method 700 for handling fault detection on the LAG 602 with the ports 604 spread across different hardware devices. The Ethernet fault management method 700 is implemented at various devices associated with the ports 604 of the LAG 602 if the LAG 602 has the member ports 604 spread out across multiple devices (step 702). Software programs fault monitoring processing on all the devices which are members of the LAG 602 with a software shim layer (step 704). The software shim layer process faults (e.g., Loss of continuity (LOC)) from all the devices (step 706). This software shim layer can be operating locally at each of the different hardware devices, but in communication therebetween. The Ethernet fault management method 700 checks if LOC is experienced by all of the devices of the LAG 602 (step 708), and the Ethernet fault management method 700 is configured to generate LOC for the LAG 602 when LOC is set on all the devices (step 710). If the LOC is cleared on any of the member ports 604 (step 712), the Ethernet fault management method 700 is configured to clear the LOC for the LAG 602. This Ethernet fault management method 700 prevents false LOC events when the receive Port of OAM messages changes and false LOC events generated when entries are configured initially on all the devices. By using the Ethernet fault management method 700, OAM can be supported efficiently on the LAG 602 with the ports 604 spread across multiple devices or multiple chassis. And this approach makes the OAM protocol mechanism completely transparent to whether fault detection is configured on the LAG ports or physical ports. The software shim layer masks unnecessary events.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. An Ethernet fault management method, comprising: receiving, from a remote Maintenance End Point, a first control packet with objects present therein; passing a copy of the first control packet to software; analyzing the first control packet in the software to determine the objects present therein and associated offsets; programming a hardware device using the software based on the determined objects present and the associated offsets such that the hardware device is configured to process subsequent control packets from the remote MEP rather than the subsequent control packets being processed in the software, wherein the hardware device is programmed to look for specific contents in the subsequent control packets at the associated offsets and to act upon any change in contents at the associated offsets; and receiving the subsequent control packets from the remote MEP and processing the subsequent control packets in the hardware device based on the programming.

2. The Ethernet fault management method of claim 1, further comprising:
   detecting a mismatch by the hardware device; and
   raising an interrupt or sending a control packet associated with the mismatch to the software for processing.

3. The Ethernet fault management method of claim 1, wherein the hardware device comprises one of a Field Programmable Gate Array, an Application Specific Integrated Circuit, and a Network Processor.

4. The Ethernet fault management method of claim 1, wherein the objects comprise Type-Length-Value (TLV) objects.

5. The Ethernet fault management method of claim 4, further comprising:
   updating the software to support extensibility of the TLV objects.

6. The Ethernet fault management method of claim 4, wherein the TLV objects comprise at least one Organization-Specific TLV.

7. The Ethernet fault management method of claim 4, wherein the TLV objects comprise an Interface Status TLV and a Port Status TLV.

8. The Ethernet fault management method of claim 7, further comprising:

removing the LOC for the LAG if any one of the ports spread across the different hardware devices has the LOC cleared.

9. The Ethernet fault management method of claim 1, wherein the control packets comprise Protocol Data Units in accordance with Connectivity Fault Management.

10. The Ethernet fault management method of claim 1, wherein the control packets comprise Continuity Check Messages (CCMs).

11. The Ethernet fault management method of claim 1, further comprising:
determining a Link Aggregation Group (LAG) comprises ports spread across different hardware devices;
programming a software shim layer on each of the different hardware devices responsive to the determining;
processing faults at the software shim layer on each of the different hardware devices; and
generating a Loss of Continuity (LOC) for the LAG if LOC is present on each of the ports spread across the different hardware devices.

12. An Ethernet node, comprising: a port communicatively coupled to a remote device; a hardware device associated with the port; and a processor configured to execute software; wherein the port, the hardware device, and the processor are cooperatively configured to: receive, from the remote device, a first control packet with objects present therein; pass a copy of the first control packet to the software; analyze the first control packet with the software to determine the objects present therein and associated offsets; program the hardware device using the software based on the determined objects present and the associated offsets such that the hardware device is configured to process subsequent control packets from the remote device rather than the subsequent control packets being processed in the software, wherein the hardware device is programmed to look for specific contents in the subsequent control packets at the associated offsets and to act upon any change in contents at the associated offsets; and receive the subsequent control packets from the remote device and process the subsequent control packets in the hardware device based on the programming.

13. The Ethernet node of claim 12, wherein the port, the hardware device, and the processor are further cooperatively configured to:
detect a mismatch by the hardware device; and
raise an interrupt or send a control packet associated with the mismatch to the software for processing.

14. The Ethernet node of claim 12, wherein the hardware device comprises one of a Field Programmable Gate Array, an Application Specific Integrated Circuit, and a Network Processor.

15. The Ethernet node of claim 12, wherein the objects comprise Type-Length-Value (TLV) objects.

16. The Ethernet node of claim 15, wherein the TLV objects comprise at least one Organization-Specific TLV, an Interface Status TLV, and a Port Status TLV.

17. The Ethernet node of claim 12, wherein the port, the hardware device, and the processor are further cooperatively configured to: update the software to support extensibility of the TLV objects.

18. The Ethernet node of claim 12, wherein the control packets comprise Protocol Data Units in accordance with Connectivity Fault Management.

19. The Ethernet node of claim 12, wherein the port, the hardware device, and the processor are further cooperatively configured to:
determine a Link Aggregation Group (LAG) in which the port participates in comprises ports spread across different hardware devices;
program a software shim layer responsive to the determining;
process faults at the software shim layer;
generate a Loss of Continuity (LOC) for the LAG if LOC is present on each of the software shim layers spread across the different hardware devices; and
remove the LOC for the LAG if any one of the ports spread across the different hardware devices has the LOC cleared.

20. A network, comprising: a plurality of interconnected nodes each supporting Connectivity Fault Management Ethernet; wherein each of the plurality of interconnected nodes comprises: a port communicatively coupled to another node of the plurality of interconnected nodes; a hardware device associated with the port; and a processor configured to execute software; wherein the port, the hardware device, and the processor are cooperatively configured to: receive, from the another node, a first control packet with Type-Length-Value (TLV) objects present therein; pass a copy of the first control packet to the software; analyze the first control packet with the software to determine the TLV objects present therein and associated offsets; program the hardware device using the software based on the determined TLV objects present and the associated offsets such that the hardware device is configured to process a subsequent control packet from the other node rather than the subsequent control packet being processed with the software, wherein the hardware device is programmed to look for specific contents in the subsequent control packets at the associated offsets and to act upon any change in contents at the associated offsets; and receive the subsequent control packet from the other node and process the subsequent control packet in the hardware device based on the programming.

* * * * *